United States Patent [19]

Lippacher et al.

[11] 4,088,054

[45] May 9, 1978

[54] IMPACT DOWEL WITH EXPANDING SLEEVE AND SPREADING ELEMENT

[75] Inventors: Wolfgang Lippacher, Breitbrunn; Paul Deutschenbaur, Unterpfaffenhofen; Gerhard Teger, Munich, all of Germany

[73] Assignee: Hilti Aktiengesellschaft, Schaan, Liechtenstein

[21] Appl. No.: 768,751

[22] Filed: Feb. 15, 1977

[30] Foreign Application Priority Data

Feb. 23, 1976 Germany ............................ 2607338

[51] Int. Cl.² .............................................. F16B 13/04
[52] U.S. Cl. ............................................. 85/84; 85/70
[58] Field of Search .................. 85/84, 83, 82, 70, 71, 85/72

[56] References Cited

U.S. PATENT DOCUMENTS

| 2,324,142 | 7/1943 | Eklund | 85/70 X |
|---|---|---|---|
| 2,542,144 | 2/1951 | Kearns | 85/72 |
| 3,044,340 | 7/1962 | Luhm | 85/83 |
| 3,198,058 | 8/1965 | Barry | 85/84 |
| 3,471,183 | 10/1969 | Fischer | 85/84 X |
| 3,482,482 | 12/1969 | Le Sage | 85/84 X |
| 3,640,326 | 2/1972 | Brown | 151/37 |
| 3,662,644 | 5/1972 | Flesch et al. | 85/84 X |
| 3,937,122 | 2/1976 | Riepel | 85/83 X |

FOREIGN PATENT DOCUMENTS

1,166,262  10/1969  United Kingdom .................... 85/84

*Primary Examiner*—Ramon S. Britts
*Attorney, Agent, or Firm*—Toren, McGeady and Stanger

[57] ABSTRACT

An impact dowel for insertion into a prepared bore hole in receiving material consists of an axially extending expansion sleeve and a spreading element insertable into the bore in the sleeve. The expansion sleeve and spreading element each have a first end and an oppositely directed second end with the first end being inserted first into the bore hole. The bore in the expanding sleeve has a pair of axially spaced restrictions which limit the axial displacement of the spreading element through the bore. The second end of the sleeve has an outwardly directed shoulder and a connecting section adjacent to the shoulder. The connecting section absorbs substantially only tensile forces.

17 Claims, 3 Drawing Figures

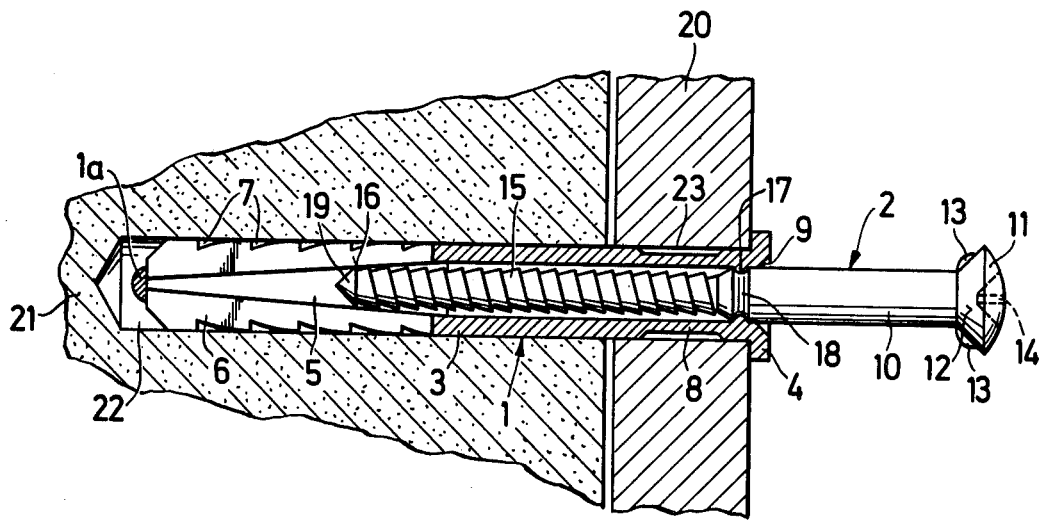

IMPACT DOWEL WITH EXPANDING SLEEVE AND SPREADING ELEMENT

SUMMARY OF THE INVENTION

The present invention concerns an impact dowel consisting of an expanding sleeve and a spreading element. The front end of the expanding sleeve, that is the end first inserted into a bore hole, has axially elongated slots and is expanded into contact with the bore hole by the spreading element. At its rear end, the expanding sleeve has a shoulder extending laterally outwardly from its outer surface. The spreading element consists of an axially elongated shank with a head at its rear end, and with a part of the shank threaded. The head is provided with a recess to receive a tool so that the spreading element can be rotated.

Known impact dowels consist of an expanding sleeve which can be anchored in a prepared bore hole in receiving material by means of a spreading element. Usually plastic is used to form the expanding sleeve of such known dowels. While plastic can be used in forming the spreading element, metal is becoming increasingly more popular.

For receiving the spreading element, the expanding sleeves of known dowels have a central bore into which the spreading element is driven either mechanically or manually to hold the parts to be secured to the receiving material by the dowel, the expanding sleeve is provided with a shoulder, usually also of plastic, which has a greater diameter than the sleeve. This arrangement has the disadvantage, on one hand, that a special impact tool is required for driving the spreading element into the bore and, on the other hand, the holding force of the dowel is limited to the holding force of the shoulder on the expanding sleeve, such holding force cannot be very great because of the relatively low strength of the plastic material. Supporting the low-strength shoulder by means of a collar on the spreading element has the additional disadvantage that blows directed against the spreading element during the completion of the driving operation cannot contribute anything to the expanding action and, further, loosen the dowel in the receiving material, due to resulting vibrations, with the anchoring force being considerably reduced.

The present invention has as its primary object the provision of a universally applicable impact dowel which provides extremely high anchoring values independent of the type of setting tool used.

In accordance with the present invention, the expanding sleeve of the dowel has a connecting section adjacent its shoulder for absorbing substantially only tensile forces. Further, within its bore, the expanding sleeve has spaced flexible stop or supporting surfaces which limit the penetration of the spreading element into the sleeve. The spreading element is in the form of a screwnail and the stop or supporting surfaces engage axially-spaced locations on the spreading element.

In this impact dowel, the anchorage in the receiving material is absorbed to a considerable extent by the screwnail or spreading element and provides, therefore, extremely high anchoring values. In accordance with the invention, the impact dowel consists of an expanding sleeve having a bore narrowing toward the front end of the sleeve and with a shoulder extending outwardly from its rear end with the shoulder having a greater diameter than the outside surface of the sleeve. In use, the shoulder bears on the receiving material or on the surface of the part to be secured to the receiving material. The screwnail or spreading element has a head added to its rearward end which has a diameter greater than that of the threaded shank which serves to spread or widen the expanding sleeve. The head of the screwnail supports the shoulder of the expanding sleeve after the impact dowel is anchored.

Between the shoulder and the main body of the expanding sleeve there is a connecting device or section which absorbs tensile forces and permits a reduction in the distance between the main portion and the shoulder of the sleeve. The action of the connecting section is extremely important, for example, in effecting the securement of a part to a receiving material where the dowel extends through an opening in the part into a prepared bore hole in the material. In such an attachment, it can happen that the expanding sleeve is completely expanded, however, the part to be secured does not fully bear on the receiving material. While in the presently known impact dowels, additional blows are required on the spreading element to effect securement, such blows can result in loosening of the sleeve, however, in the present invention such additional blows only tend to shorten the axial dimension of the sleeve. As a result, such blows acting on the spreading element are not transmitted into the expanding portion of the sleeve, but rather act over the head of the spreading element against the shoulder on the sleeve and press the part to be secured firmly against the receiving material, affording a tight engagement of the part with maximum anchoring values for the dowel. If the impact dowel of the present invention is not used in such a bushing arrangement in attaching a part to the receiving material, the connecting section assures that any blows acting on the spreading element after the expansion of the sleeve do not lead to a subsequent loosening. Therefore, the anchoring of the impact dowel in the present invention is completely without any problems, since no special properties are to be taken into consideration.

Preferably, the spreading element is in the form of a screwnail and is combined with the expanding sleeve as a preassembled unit which can be introduced into a recess or bore hole in a receiving material or through a part to be fastened to the receiving material and then into the bore hole. Accordingly, it is desirable to be able to grasp the impact dowel only by the screwnail and to insert it into the prepared bore hole. In such insertion, it is important for the screwnail to remain stationary relative to the expanding sleeve even when certain axial forces are applied before the shoulder on the expansion sleeve bears against the receiving material or on the part to be fastened into the receiving material. Another important feature is that the spacing between the expanding portion of the sleeve and the shoulder is not shortened during the insertion of the impact dowel, that is, that the connecting section which absorbs only tensile forces, does not become inoperative. To prevent such an occurrence, the expanding sleeve is provided with at least two axially spaced flexible stop or supporting surfaces which cooperate with the screwnail in preventing any relative movement during insertion. These surfaces serve to divide the forces in the range of the connecting device. The applied forces are directed from the shoulder over one of the stop or supporting surfaces to the screwnail and from the other surface to the section of the sleeve which expands into contact with the bore hole. Pressures may occur in the receiving material during the insertion of the impact dowel by external resistances, for example, because of materials within the bore hole, and in the present arrangement such pressures are transmitted by the screwnail and do not lead to premature widening of the expanding sleeve. The connecting section only has to absorb tensile forces, particularly at the time when the shoulder bears on the receiving material or on the part to be secured to it, the stop or supporting surfaces then yield so that the desired expansion of the sleeve and proper anchoring of the impact dowel commences.

The connecting section, absorbing only tensile forces, is preferably formed as an annular wall section of the expanding sleeve located adjacent the shoulder, with the wall section having a reduced diameter as compared to the adjacent parts of the sleeve and its shoulder. When forces are applied against the shoulder, after the action of the stop or supporting surfaces has been eliminated, the connecting section is compressed much like a bellows with the axial length of the sleeve between its expanding section and the shoulder being shortened. This arrangement of the connecting section is particularly useful when the entire expanding sleeve is made of the same material, that is, plastic.

In another embodiment of the impact dowel, the expanding sleeve can be formed of two telescopic sections, one forming the main body or portion of the sleeve and the other forming the shoulder portion insertable into the main portion in a telescopic manner. To afford a certain resistance to the telescopic action, which must be overcome by compressive forces, toroidal protuberances can be provided on one wall section which cooperate with corresponding recesses in the juxtaposed wall section. This embodiment of the connecting section is particularly useful when, for practical purposes, a different material is employed for the shoulder than for the sleeve, for instance, the shoulder may be formed of metal while the sleeve is formed of plastic. The stop or supporting surface on the expanding sleeve adjacent the shoulder is preferably in the shape of an inwardly directed toroidal protuberance which cooperates or interengages a correspondingly shaped annular slot in the spreading element or screwnail. The other stop or supporting surface spaced axially from the shoulder toward the first or front end of the sleeve is preferably in the form of a cross-sectional constriction within the bore of the sleeve which cooperates with the forward portion of the spreading element. The specific form of the constriction is unimportant, that is, it can be in the form of a conically tapering zone or a stepped zone.

The mode of operation of the stop or supporting surfaces in the bore of the expanding sleeve depends on the rigidity of the sleeve wall. Such rigidity is, in turn, influenced by the provision of elongated slots in the portion of the sleeve which is expanded into contact to the bore hole. If the elongated slots commence from the forward end of the expanding sleeve, the finger-like section of the sleeve between the slots can be spread apart without too much effort and may result in a considerable reduction in the loading capacity of the stop or supporting surfaces within the bore of the sleeve, particularly for long sleeves. Preferably, where the slots extend from the front end of the sleeve, the finger-like sections of the sleeve between the slots are interconnected by a known web. This arrangement also assures that the impact dowel can be driven without difficulty into a prepared bore hole without prematurely expanding into contact with the bore hole.

Another feature of the present invention is that detachability is frequently required for impact dowels of the type embodied in the present invention. It is important that the spreading dowel, such as in the form of the screwnail, can be removed once it is inserted and the expansion sleeve anchored. To afford withdrawal of a spreading element, the screwnail is threaded over an axially extending portion of its forward end. With such a thread on the forward end of the element, it can be unscrewed from the sleeve with a suitable tool, for example, a screwdriver. The selection of a suitable tool for unscrewing or removing the screwnail depends on the arrangement of the head of the screwnail which can be designed to include, in a known manner, a screw-slot, a cross-slot, a polyhedron-shaped recess or the like. Preferably, the thread is sawtooth-shaped with a flank extending transversely of the axis of the screwnail at the rear end of each toothed portion and with another flank disposed at a slight angle to the axis of the screwnail and extending between the front and the rear ends of each toothed section. Such a threaded arrangement has an advantageous effect on the anchorage of the screwnail in the expanding sleeve and, in addition, has the advantage that the expanding sleeve is not scoured out when the dowel is driven into a bore hole and thereby prevents any possibility of the screwnail being too loosely fitted into the sleeve.

As mentioned above, it is frequently useful if the spreading element can be detached from the sleeve. Since the shoulder of the sleeve normally bears on the part being secured to the receiving material, the part cannot be removed after the spreading element has been removed. To effect removal the shoulder must also be removed. This can be done, however, in a relatively simple manner, for example, if the expanding sleeve is made up of several parts, one telescoping into the other. If the expanding sleeve is an integral member, with the connecting section provided by a reduced thickness section, the removal of the shoulder may require considerable extra effort. Normally, the connecting section can be torn by using an appropriate tool so that the shoulder can be removed. To effect such removal, the spreading element, in the form of a screwnail, has a sharp point at its leading end which can be used to score the portion of the bore in the sleeve formed by the connecting section for tearing the rearward portion of the sleeve out without any great effort.

For optimum support of a low-strength shoulder by the screwnail, the head of the screwnail has a conically-shaped surface which bears against a similarly shaped surface in the bore portion of the shoulder This arrangement has the effect that the screwnail can be forced outwardly by a small amount due to the forces acting on the conically-shaped section of the head if the shaft or shank of the screwnail has been sufficiently anchored in the expanding sleeve. This effect can be increased if knobs or similar projections are provided on the conically-shaped section of the head which must be forced into the correspondingly shaped section of the shoulder in the expanding sleeve, so that the head of the screwnail bears tightly on the shoulder. The tight bearing action of the head of the screwnail on the shoulder piece of the sleeve represents an optical control which indicates whether the screwnail has overcome sufficient resistance in the expanding sleeve and the dowel has thus attained sufficient anchorage in the bore hole of the receiving material. This control is particularly important when the screwnail is driven in mechanically, for example, using a pneumatic collar, a drill hammer or the like, since the direct contact to the resistance offered when the screwnail is driven in is lost when using such tools.

Due to the division of the force in the range of the connecting section, the impact dowel embodying the present invention can be set in any desired manner, without impairing its effects. The simplest way of setting the dowel into a prepared bore hole is by striking the head of the spreading element with an ordinary hammer. In such a driving operation, the stop or supporting surfaces yield when the shoulder bears on the receiving material or on the part to be fastened to the receiving material. Next the anchoring step takes place by expanding the sleeve into engagement with the bore hole. If a mechanical setting operation is used, a mixed application of forces occurs, that is, the dowel is introduced into the prepared bore hole by the application force to the shoulder and then by striking the spreading element after the shoulder is in tightly bearing contact with the receiving material or with the part to be fastened thereto. In all possible types of setting of the impact dowel, the connecting section performs its assigned function and the dowel retains its advantageous properties.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive manner in which there are illustrated and described preferred embodiments of the invention.

DETAILED DESCRIPTION OF THE INVENTION

Figure 1:
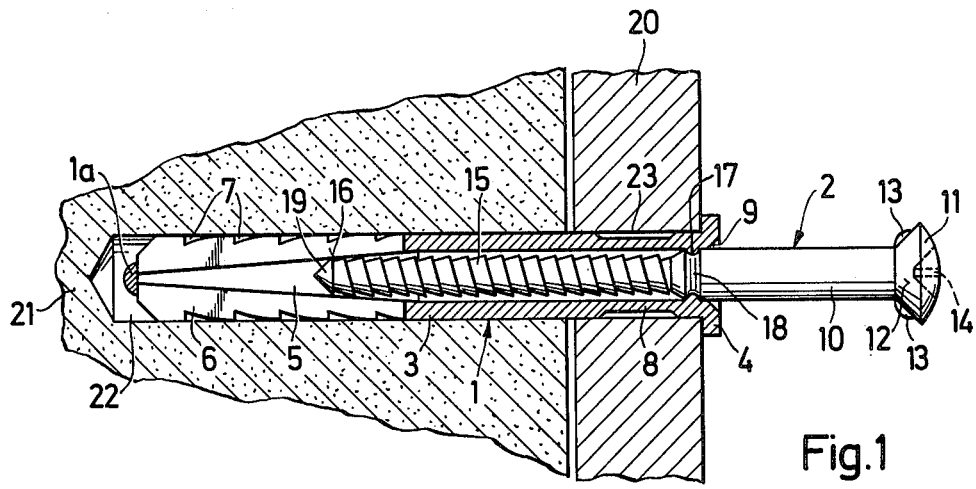
FIG. 1 is an axially extending side view, of an impact dowel embodying the present invention inserted into a prepared bore hole for anchoring a part to a receiving material.
Figure 2:
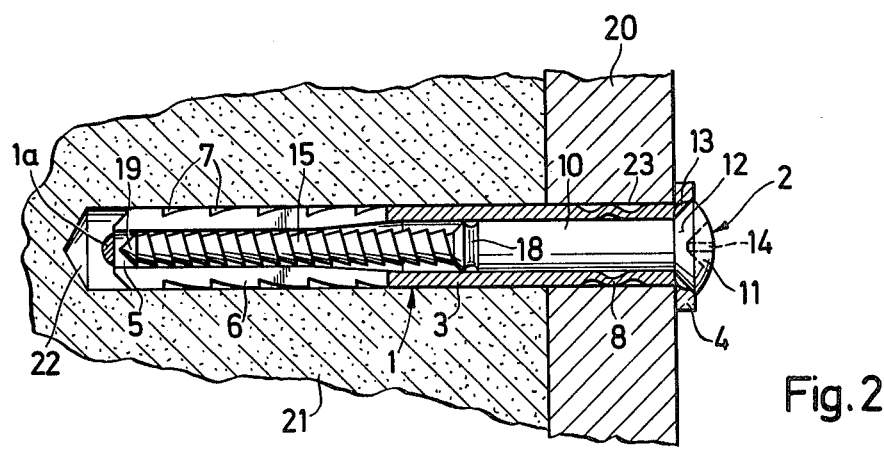
FIG. 2 is a view, similar to FIG. 1, however, illustrating the impact dowel in the anchored position securing the part to the receiving material.

In FIGS. 1 and 2, an impact dowel is illustrated consisting of an expanding sleeve 1 and a spreading element 2 in the form of a screwnail. Each of the expanding sleeve 1 and the spreading element 2 has a first end and an oppositely directed second end with the first end being inserted first into the bore hole 22 formed in the receiving material 21. The expanding sleeve 1 has an axially extending main section 3 extending from the first end to the second end with a shoulder 4 extending laterally outwardly from the main section at the second end. Further, an axially elongated bore 5 extends through the sleeve from its second to its first end. In the forward section of the sleeve, that is, from its first end extending toward its second end, the elongated bore tapers conically inward from the diameter of the sleeve at its second end to a reduced diameter at its first end. Further, in this conically tapering or constricted forward section of the sleeve, axially elongated slots 6 extend from its first end toward the second end for the axial length of the constricted portion. The axially extending parts of the sleeve located between the slots 6 are connected together by a web 1a located at the first end of the sleeve. On the exterior of the sleeve 1 for the axial length of the slots 6, ring shaped slots 7 are formed for providing gripping engagement with the surface of the bore hole 22 in the receiving material 21. In the main section 3 of sleeve 1 adjacent the shoulder 4 there is a connecting section 8 having a reduced wall thickness relative to the thickness of the adjacent parts of the main section and the shoulder. As can be seen in FIG. 1, the reduced thickness is provided by an axially extending annular recess formed in the outer surface of the main section.

Spreading element or screwnail 2 has an axially extending shank 10 and a head 11 located at the second end of the shank. The transition of the head 11 from the shank 10 is provided by a frusto-conically shaped section 12 on which angularly spaced knobs or projections 13 are provided. The inner surface of the sleeve in the portion forming the shoulder 4 has a frusto-conically shaped surface for receiving the similarly shaped surface on the head. For the engagement of tools in the head, a cross slot 14 is provided, as shown in dotted lines. It will be appreciated, however, that other forms of slots or recesses can be provided in the head to receive a particular form of tool. Extending from the first end of the shank toward the second end is sawtooth-shaped thread 15 with a point 19 at the first end.

As can be seen best in FIG. 1, expanding sleeve 1 has two stop or supporting surfaces for the screwnail 2, one in the form of a cross sectional constriction 16 and the other in the form of a torus-shaped inwardly extending projection 17 both within the bore in the sleeve. The cross sectional constriction 16 tapers inwardly from approximately a midpoint of the bore to its first end and cooperates with the front part of the shank 10 of the screwnail which is provided with a thread 15. Spaced axially from the constriction toward the second end of the bore, the torus-shaped projection 17 is shown in engagement within an annular slot 18 in the screwnail with the slot located at the second end of the threaded section 15 and spaced axially from the second end of the shank.

FIG. 1 shows the impact dowel inserted into a bore hole 22 in the receiving material 21 in preparation for securing a part 20 to the receiving material. The bore hole 22 has been prepared or formed in the receiving material so that the impact dowel can be inserted into it. The part 20 has an opening 23 which is aligned with the bore hole so that the preassembled impact dowel can be inserted through the opening 23 into the bore hole until the shoulder 4 bears against the outer surface of the part 20. As illustrated in FIG. 1, the part 20 does not yet bear against the receiving material 21 because of the low energy expended in inserting the impact dowel.

In FIG. 2 the completion of the attachment of the part 20 to the receiving material 21 is displayed, and such attachment is effected by directing blows against the head of the screwnail to drive it into the expanding sleeve 1. As the screwnail is driven into the sleeve, the stop or supporting surfaces 16 and 17 on the sleeve have yielded and the spreading element has been driven completely into the sleeve which has widened at its forward end for securing the sleeve in the bore hole. Due to the impact imparted to the spreading element, the conically shaped surface 12 on the head 11 has the knobs 13 thereon pressed into the correspondingly shaped conical surface 9 in the bore through the shoulder 4. This close engagement of the head of the spreading element and the surface in the bore through the shoulder afford a visual indication that sufficient anchorage has been achieved. The final blows directed against the head of the screwnail 2 effect the shortening or reduction in the distance between the forward end of the sleeve and the shoulder with the deformation of the wall section 8 resulting in a tight bearing contact of the part 20 on the surface of the receiving material 21.

Figure 3:
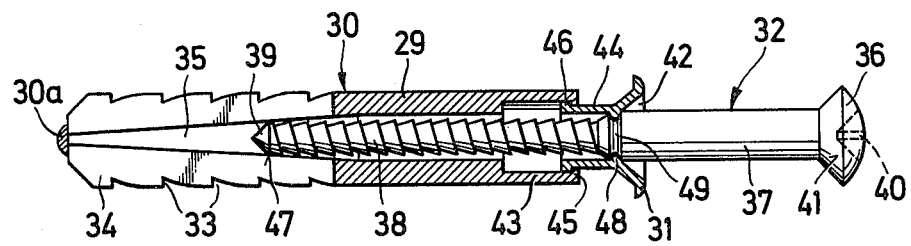
FIG. 3 is an axially extending side view, partly in section of another impact dowel embodying the present invention.

In FIG. 3 another embodiment of the impact dowel of the present invention is illustrated and includes an expanding sleeve 30 with a separate shoulder piece 31 fitted into the tubular section 29 and a screwnail 32 is assembled into the tubular section and the shoulder. In its axially extending forward region, the expanding sleeve has a plurality of serially arranged ring-shaped recesses 33 on its outer surface and it also has axially elongated slots 34 extending from its first end. As with the embodiment shown in FIGS. 1 and 2, a web 30a is provided at the forward end of the sleeve for securing the parts of the sleeve together which remain between the slots 34. An axially elongated bore extends through the expanding sleeve from its second or rearward end to its first or forward end and the bore conically tapers inwardly from approximately a midpoint of its length to the first end of the bore.

Screwnail 32 has a head 36 projecting laterally outwardly from an axial extending shank 37 which extends into the bore 35 in the sleeve. Extending from the forward end of the shank 37 for approximately half of its axial length, is a sawtooth-shaped thread 38 with a point 39 located at the first end of the threaded section. As illustrated in dotted lines, the head 36 of the spreading element has a cross slot 40 for receiving a tool for effecting the rotation of the screwnail. The portion 41 of the head 36 extending from the shank 37 is conically shaped for engagement within a correspondingly shaped recess in the bore through the shoulder 31.

As a connecting section between the tubular section 29 and the shoulder 31 of the expanding sleeve 30 are telescoping wall sections 43,44, one formed on the second or rearward end of the tubular section and the other formed on the first or forward end of the shoulder. Collars 45,46 are provided on the wall sections 43,44 for effecting assembly of the parts and for securing them together. As in the embodiment shown in FIGS. 1 and 2, in FIG. 3, stop or supporting surfaces for the screwnail 32 are provided by the constriction 47 formed in the forward portion of the bore in the sleeve and also by a torus-shaped projection formed inwardly from the bore in the shoulder 31. The front part of the screwnail 32 cooperates with the constriction 47 while an annular slot or recess 49 is formed at the rearward end of the threaded section and receives the torus-shaped projection 48.

The insertion and final anchoring of the impact dowel are displayed in FIG. 3 is effected in the same manner as the dowel disclosed in FIGS. 1 and 2. The difference in the two embodiments is in the manner in which the connecting section operates. As the screwnail 32 is being driven into the expanding sleeve and its conically shaped surface 41 contacts the correspondingly shaped recess 42 in the shoulder, the head of the screwnail drives the wall section 44 in a telescoping manner, into the corresponding wall section 43 at the rearward end of the tubular section 29. This telescoping action provides a visual indication that the anchoring action has been achieved.

While specific embodiments of the invention have been shown and described in detail to illustrate the application of the inventive principles, it may be understood that the invention may be embodied otherwise without departing from such principles.

What is claimed is:

1. Impact dowel for insertion into a bore hole in a receiving material comprising an axially elongated expanding sleeve to be inserted into the bore hole and an axially elongated spreading element insertable into said sleeve for expanding the sleeve laterally outwardly into engagement with the surface of the receiving material in the bore hole, said expanding sleeve and spreading element each having a first forward end and a second rearward end with the first end being inserted first into the prepared bore hole for the dowel, said expansion sleeve having an expansion section extending from the first end toward the second end thereof for expansion laterally outwardly into engagement with the surface in the bore hole and said sleeve having axially extending slots in said expansion section, said expanding sleeve having a bore therein extending at least from the second end into said expansion section, said bore having a first diameter at the second end of said sleeve and at least a second diameter in said expansion section which is smaller than said first diameter, said expanding sleeve having a shoulder at the second end thereof extending radially outwardly from the outer surface of said sleeve, said spreading element having an axially elongated shank extending from the first end to the second end thereof and a head located at the second end of said shank extending laterally outwardly from the shank, said shank being threaded for at least a portion of the axial length thereof, wherein the improvement comprises that said expanding sleeve having an axially extending second section extending from said second end thereof toward said expansion section, and said second section having an axially extending connecting section located therein adjacent said shoulder and spaced from said expansion section for absorbing substantially only tensile forces, said connecting section including means for being deformed in the axial direction of said expanding sleeve for reducing the axial length of said connecting section upon impact driving of said spreading element into said bore, and said expanding sleeve having at least two flexible supporting sections intermediate the first and second ends thereof and disposed in surface contact with the shank of said spreading element and disposed at axially spaced locations within the bore in said sleeve for limiting the penetration of said spreading element into said bore in said sleeve.

2. Impact dowel, as set forth in claim 1, wherein said connecting section is an annular shaped axially extending part of said expanding sleeve located adjacent said shoulder and having a reduced wall thickness compared to the wall thickness of the adjacent sections of said expanding sleeve.

3. Impact dowel, as set forth in claim 2, wherein said annular shaped axially extending part having the same inside diameter as the adjacent sections of said sleeve and a reduced outside diameter compared to the outside diameter of the adjacent sections of said sleeve.

4. Impact dowel, as set forth in claim 3, wherein said shoulder being formed integrally with said expansion sleeve.

5. Impact dowel, as set forth in claim 1, wherein said expansion sleeve comprises a sleeve section and a separate shoulder section, said connecting section comprising the second end of said sleeve section and said shoulder section, with said sections being disposed in telescoping relation.

6. Impact dowel, as set forth in claim 5, wherein said shoulder section being telescopically insertable into the second end of said sleeve section, and means on said sleeve section and said shoulder section for retaining said shoulder section in said sleeve section.

7. Impact dowel, as set forth in claim 1, wherein said flexible supporting sections comprise a first supporting section and a second supporting section, said first supporting section comprising a torus-shaped protuberance located in the bore adjacent the second end of said expansion sleeve and said spreading element having an annular shaped recess arranged to receive said torus-shaped protuberance for limiting axial displaceability between said spreading element and said sleeve.

8. Impact dowel, as set forth in claim 7, wherein said annular shaped recess on said spreading element being axially spaced from the first and second ends of said spreading element so that a substantial axial length of said spreading element extends between said recess and said head thereof.

9. Impact dowel, as set forth in claim 7, wherein said second supporting section comprises an axially extending constriction in the bore in the expansion section of said expanding sleeve, and said constriction having a diameter therein at the second end of said constriction which is substantially the same diameter as the first end of the threaded portion of said spreading element.

10. Impact dowel, as set forth in claim 9, wherein the threaded portion of said spreading element extends axially from the first end thereof to a location midway between the first and second ends of said spreading element.

11. Impact dowel, as set forth in claim 10, wherein said threaded portion is sawtooth-shaped having a plurality of serially arranged toothed parts with each said toothed part having a first end closer to the first end of said spreading element and a second end closer to the second end of said spreading element and each said toothed part having a first flank diverging outwardly from the first end to the second end thereof and a second flank located at the second end of the toothed part and extending transversely of the axis of said spreading element and of said first flank.

12. Impact dowel, as set forth in claim 11, wherein the first end of said spreading element being pointed.

13. Impact dowel, as set forth in claim 1, wherein the head of said spreading element having a conically shaped section extending outwardly from the shank thereof.

14. Impact dowel, as set forth in claim 13, wherein said head having angularly shaped projections extending outwardly from the conically shaped section thereof.

15. Impact dowel, as set forth in claim 14, wherein the outer surface of said head facing away from the shank of said spreading element has a recess therein for receiving a tool for rotating said spreading element about its axis within said expanding sleeve.

16. Impact dowel, as set forth in claim 15, wherein said recess is a cross slot.

17. Impact dowel, as set forth in claim 13, wherein the bore in said shoulder of said expansion sleeve being conically shaped to correspond to the conically shaped section on the head of said spreading element.

* * * * *